United States Patent [19]

Reiff et al.

[11] Patent Number: 5,021,520

[45] Date of Patent: Jun. 4, 1991

[54] CROSSLINKED POLYURETHANE-POLYUREA POWDERS, A PROCESS FOR THEIR PRODUCTION AND THEIR USE AS FILLERS IN TWO-COMPONENT POLYURETHANE COATING COMPOSITIONS

[75] Inventors: Helmut Reiff; Dieter Dieterich, both of Leverkusen, Fed. Rep. of Germany; René Stepanek, Pfungen, Switzerland

[73] Assignee: Bayer Aktiengesellschaft, Leverkusen, Fed. Rep. of Germany

[21] Appl. No.: 495,530

[22] Filed: Mar. 19, 1990

[30] Foreign Application Priority Data

Mar. 23, 1989 [DE] Fed. Rep. of Germany ....... 3909597

[51] Int. Cl.$^5$ ............................................. C08F 283/06
[52] U.S. Cl. ..................................... 525/458; 528/59; 528/65; 528/66; 528/77
[58] Field of Search .................... 525/458; 528/59, 65, 528/66, 77

[56] References Cited

U.S. PATENT DOCUMENTS

| | | | |
|---|---|---|---|
| 3,868,350 | 2/1975 | Reiff et al. | 260/77.5 |
| 3,870,684 | 3/1975 | Witt et al. | 260/75 |
| 3,917,741 | 11/1975 | McGarr | 260/859 |
| 4,032,516 | 6/1977 | McGarr | 260/77.5 |
| 4,184,990 | 1/1980 | Reischl et al. | 528/80 |
| 4,293,679 | 10/1981 | Cogliano | 528/77 |
| 4,895,883 | 1/1990 | Pedain et al. | 528/59 |
| 4,945,149 | 7/1990 | Matsumoto et al. | 528/65 |

OTHER PUBLICATIONS

Kunststoffe, Polyurethane Handbook 1984, correspond. eng. vs. pp. 26–27.

Houben-Weyl Methoden der Organischen Chemie, 4th Ed., vol. E20, 1987.

*Primary Examiner*—Earl Nielsen
*Assistant Examiner*—John M. Cooney
*Attorney, Agent, or Firm*—Joseph C. Gil; Thomas W. Roy

[57] ABSTRACT

The present invention relates to crosslinked polyurethane-polyurea powders which are prepared by a process which comprises dispersing NCO semiprepolymers in an aqueous medium, forming powders and isolating the powders from the aqueous medium, the NCO semiprepolymers having an NCO content of 10 to 20%, being liquid at room temperature and/or dissolved in isocyanate-inert, water-soluble solvents and based on the reaction product of (a) a polyisocyanate component based on at least one organic polyisocyanate with a polyol component having an average hydroxyl functionality of 2.3 to 4.0 and containing (b) a hydrophobic polyol component containing less than 25% by weight of ethylene oxide units, —CH$_2$—CH$_2$—O—, and (c) a hydrophilic polyether component comprising monohydric or polyhydric alcohols containing at least 70% by weight of structural units corresponding to the formula

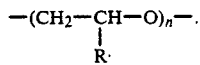

The present invention also relates to a process for the preparation of these crosslinked polyurethane-polyurea powders and to their use as fillers in two-component polyurethane coating compositions.

3 Claims, No Drawings

CROSSLINKED POLYURETHANE-POLYUREA POWDERS, A PROCESS FOR THEIR PRODUCTION AND THEIR USE AS FILLERS IN TWO-COMPONENT POLYURETHANE COATING COMPOSITIONS

BACKGROUND OF THE INVENTION

1. Field of the Invention

The present invention relates to a process for the production of crosslinked polyurethane-polyurea powders by mixing certain NCO semiprepolymers with an aqueous medium, to the crosslinked polyurethane-polyurea powders prepared by this process and to their use as fillers in two-component polyurethane coating compositions.

2. Description of the Prior Art

Uncrosslinked polyurethane (PUR) powders are known. They may be produced, for example, by grinding elastomer granulates. The disadvantage is that the ground material has to be cooled with solid carbon dioxide or liquid nitrogen and the powders show unsatisfactory surface quality (cf. Kunststoffe 74, 195 (1984)). It is also known that aqueous polyurethane dispersions can be converted into PUR powders by spray drying. In this case, too, the powders become tacky under the effect of heat; their flow properties and their quality deteriorates accordingly (cf. for example Houben-Weyl, Methoden der organischen Chemie, 4th Edition, Vol. E20, page 1697 (1987)).

The production of uncrosslinked PUR powders in organic solution using special emulsifiers is disclosed, for example, in DE-OS 2 330 601 or U.S. Pat. No. 4,032,516. The "emulsifier/shear force process" is recommended in DE-OS 2 906 113 for the production of uncrosslinked PUR powders, while the production of uncrosslinked PUR powders by the acetone process is so described in DE-PS 2 226 526.

Previously, very little has been known concerning crosslinked PUR powders. According to DE-PS 1 282 962, solutions of slightly cationically modified NCO prepolymers in acetone are crosslinked with a mixture of diamines and triamines. The NCO prepolymers used have an NCO content of only 1 to 5% by weight, so that only slightly crosslinked polyurethane polyureas having softening or melting ranges of about 90° to 180° C. are obtained as the end products of the process.

It has now surprisingly been found that it is possible to obtain valuable crosslinked polyurethane-polyurea powders by mixing certain isocyanate semiprepolymers, which are locally nonionically/hydrophilically modified, with water. The resulting polyurethane-polyurea powders are valuable fillers for coating compositions of any kind, especially for two-component polyurethane coating compositions, and enable coatings having particularly good surface properties to be obtained.

SUMMARY OF THE INVENTION

The present invention relates to crosslinked polyurethane-polyurea powders which are prepared by a process which comprises dispersing NCO semiprepolymers in an aqueous medium, forming powders and isolating the powders from the aqueous medium, the NCO semiprepolymers having an NCO content of 10 to 20%, being liquid at room temperature and/or dissolved in isocyanate-inert, water-soluble solvents and based on the reaction product of (a) a polyisocyanate component based on at least one organic polyisocyanate with a polyol component having an average hydroxyl functionality of 2.3 to 4.0 and containing (b) a hydrophobic polyol component containing less than 25% by weight of ethylene oxide units, —CH$_2$—CH$_2$—O—, and based on at least one polyether polyol having a molecular weight of 400 to about 10,000 and up to 10% by weight, based on the total weight of component b), of one or more polyhydric alcohols having a molecular weight below 400 and (c) a hydrophilic polyether component comprising monohydric or polyhydric alcohols containing at least 70% by weight, based on the weight of component c), of structural units corresponding to the formula

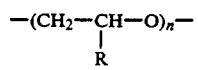

wherein
n equals 15 to 80 and
R is hydrogen or a methyl group, provided that at least 80% of the substituents R are hydrogen, the hydrophilic polyether component being present in an amount sufficient to provide the NCO semiprepolymers with a content of about 0.5 to 12% by weight of these structural units.

The present invention also relates to a process for the preparation of these crosslinked polyurethane-polyurea powders and to their use as fillers in two-component polyurethane coating compositions.

DETAILED DESCRIPTION OF THE INVENTION

The polyisocyanate component a) is based on at least one organic polyisocyanate. These polyisocyanates are known and include aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula

wherein
n=2 to 4, preferably 2, and
Q is an aliphatic hydrocarbon radical containing 2 to 15, preferably 6 to 10 carbon atoms; a cycloaliphatic hydrocarbon radical containing 4 to 15, preferably 5 to 10 carbon atoms; an aromatic hydrocarbon radical containing 6 to 15, preferably 6 to 13 carbon atoms; or an araliphatic hydrocarbon radical containing 8 to 15, preferably 8 to 13 carbon atoms.

Suitable examples include 1,6-diisocyanatohexane; 1,10-diisocyanatodecane; 1-isocyanato-3,3,5-trimethyl-5-isocyanatomethyl cyclohexane (IPDI); 4,4'-diisocyanatodicyclohexylmethane; 2,4- and/or 2,6-diisocyanatotoluene; 4,4'-diisocyanatodiphenyl methane, mixtures thereof with 2,4'-diisocyanatodiphenyl methane and optionally 2,2'-diisocyanato-diphenyl methane, and mixtures of these isomers with their higher homologs obtained by the known phosgenation of aniline/formaldehyde condensates. Other suitable polyisocyanates include urethane-, biuret-, uretdione-, carbodiimide-, uretoneimine- or isocyanuratemodified polyisocyanates based on the previously mentioned polyisocyanates. The polyisocyanate component a) has an NCO content of about 20 to 50% by weight. A particularly preferred polyisocyanate component a) is based on 2,4-diisocyanatotoluene and mixtures thereof with up to 35% by weight, based on the mixture, of 2,6-diisocyanatotoluene; 1,6-diisocyanatohexane; IPDI; 4,4'-diisocyanatodiphenyl methane, mixtures thereof with 2,4'-diisocyanatodiphenyl methane and, optionally, 2,2'-diisocyanatodiphenyl methane and mixtures of these isomers with their higher homologs.

The hydrophobic polyol component b) is based on at least one polyether polyol having a molecular weight of 400 to about 10,00 D, optionally in admixture with u to about 10% by weight, based on the total weight of component b), of polyhydric alcohols having a molecular weight below 400. Component b) contains less than 25% by weight of ethylene oxide units —CH$_2$—CH$_2$—O—.

The polyether polyols present in component b) are obtained in known manner by alkoxylating suitable starter molecules such as water, ethylene glycol, propylene glycol, glycerol, trimethlol propane, sorbitol or sucrose and mixtures thereof. The type of and quantitative ratios between the starter molecules are preferably selected so that the average hydroxyl functionality of components b) and c) is 2.3 to 4.0. The alkylene oxide preferably used for the production of the polyether polyols is propylene oxide, optionally in admixture with ethylene oxide, although the quantity of ethylene oxide used must be less than 25% by weight as previously disclosed.

The polyhydric alcohols having a molecular weight below 400 which are optionally present in component b) in addition to the polyether polyols, include the previously mentioned starter molecules and also low molecular weight polyether polyols such as diethylene glycol, triethylene glycol, dipropylene glycol, tripropylene glycol and low molecular weight alkoxylation products of higher alcohols.

The hydrophilic polyether components c) is based on one or more monohydric or polyhydric alcohols containing structural units corresponding to the formula

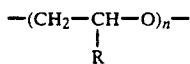

wherein n equals 15 to 80 and

R is hydrogen or a methyl group, provided that at least 80%, preferably 100%, of the substituents are hydrogen. The structural units corresponding to the above formula make up at least 70% of the weight of component c).

Component c) may be based completely or partly polyethylene glycols having a molecular weight of about 1,000 to 12,000, preferably about 4,000 to 9,000, or also on alkoxylation products within this same molecular weight range and initiated with the previously mentioned high-functionality starter molecules. The alkylene oxides used in the alkoxylation reaction are ethylene oxide and optionally propylene oxide in the quantities set forth in regard to the above formula. Component c) may also be based completely or partly on monohydric polyether alcohols which have been prepared by the alkoxylation of monohydric starter molecules such as a C$_1$-C$_4$ alkanol Finally, component c) may be based completely or partly on the diols containing lateral polyether side chains set forth in U.S. Pat. No. 3,905,929 or U.S. Pat. No. 4,190,566, both of which are herein incorporated by reference.

In the production of the NCO semiprepolymers, the type and quantity of components b) and c) are selected so that the average hydroxyl functionality is 2.3 to 4.0 and the NCO semiprepolymers have a content of structural units, incorporated through component c) and corresponding to the above formula, of about 0.5 to 12% by weight, preferably about 1.0 to 8.0% by weight.

In the production of the NCO semiprepolymers, the starting materials are generally reacted at a temperature of about 20° to 150° C., preferably at a temperature of about 60° to 120° C., while maintaining an equivalent ratio of isocyanate groups to isocyanate reactive groups of about 5:1 to 25:1, preferably about 5:1 to 15:1.

In the production of the NCO semiprepolymers, the starting components a), b) and c) may be reacted in any order. The polyisocyanate component a) is preferably reacted with a mixture of components b) and c). However, it is also possible to initially prepare a "hydrophilic diisocyanate" (i.e., a diisocyanate having a hydrophilic polyether side chain) from all or a portion of polyisocyanate component a), preferably a diisocyanate, and a monohydric hydrophilic polyether of the type previously mentioned in accordance with U.S. Pat. No. 3,920,598, herein incorporated by reference. The hydrophilic diisocyanate is subsequently reacted with the other components, particularly component b).

The production of the NCO semiprepolymers may be carried out in the presence of the known catalysts such as dibutyltin dilaurate, tin dioctoate, dibutyltin dichloride, triethylamine, triethylenediamine and mixtures of such catalysts. The reaction may be carried out in the absence of a solvent or in the presence of a hydrophilic water-miscible solvent such as acetone or N-methyl pyrrolidone.

In general, the NCO semiprepolymers or solutions thereof in the solvents mentioned have a viscosity at 23° C. of about 500 to 10,000 mPa.s.

The second stage of the process according to the invention is directed to dispersing the NCO semiprepolymers or their solutions in water. This step preferably takes place at a temperature about 10° to 80° C. using mixing units which are suitable for the generation of high shear forces. Stirrers of this type include the Ultraturrax machine (type T 45 N) made by the IHA company of Staufen, Federal Republic of Germany.

On a laboratory scale, mixing may also be carried out briefly with the above-mentioned Ultraturrax stirrer (experimental part) and then with normal laboratory stirrers, for example at 50 to 600 r.p.m. However, by using higher amounts of the hydrophilic component (e.g., about 4 to 12% by weight of ethylene oxide units), the viscosities may be adjusted to particularly low values (<500 mPa.s), thus completely eliminating the need for high-performance stirrers.

Crosslinked polyurethane ureas in the form of unstable dispersions in water are formed during dispersion due to the reactions which take place between the free isocyanate groups and the water. The polyurethane-polyurea powders are precipitated from these unstable dispersions. They may be isolated in known manner, for example, by centrifugation or filtration.

The particle diameter of the powders thus obtained may be adjusted within wide limits of 5 to 500 μm by variation of the chemical composition of the NCO semiprepolymers (particularly the degree of hydrophilicity) and/or by the process conditions selected for mixing the NCO semiprepolymers with water.

The powders according to the invention are valuable fillers for paints, particularly two-component polyurethane coating compositions which are based on a polyisocyanate component and an isocyanate-reactive component. Preferably at least a portion of the isocyanate-reactive component is a polyhydroxyl compound. The presence of the powders in coating compositions results in paint surfaces which are distinguished by high flatting levels and by a "warm" leather- or fabric-like feel.

In the following examples, all percentages are by weight unless otherwise stated.

EXAMPLES

The following polyether alcohols were used in the examples:

Polyether 1 (component b)

A polyether polyol having an average hydroxyl functionality Df 2.8, a viscosity of 630 mPa.s (25° C.) and a molecular weight of 3,700, and prepared by the propoxylation of a mixture of trimethylol propane and propylene glycol.

Polyether 2 (for comparison, does not correspond to the invention)

A monohydric polyether alcohol having a molecular weight of 1080 and prepared by the alkoxylation of n-dodecanol using a mixture of propylene oxide and ethylene oxide in a molar ratio of 1:1.3.

Polyether 3 (for comparison, does invention)

A monohydric polyether alcohol having a molecular weight of 7,000 and prepared by the alkoxylation of diethylene glycol monobutyl ether using a mixture of propylene oxide and ethylene oxide in a molar ratio of 1:1.1.

Polyether 4 (comparison)

A polyether diol having a molecular weight of 2,000 and prepared by the alkoxylation of propylene glycol using a mixture of propylene oxide and ethylene oxide in a molar ratio of 1:1.1

Polyether 5 (comparison)

A polyether triol having a molecular weight of 4,700 and prepared by the alkoxylation of glycerol using a mixture of propylene oxide and ethylene oxide in a molar ratio of 1:1.1.

Polyether 6 (component c)

A monohydric polyether alcohol having a molecular weight of 2150 and prepared by the ethoxylation of n-butanol and subsequent propoxylation of the ethoxylation product (ratio by weight of EO:PO ™ 79:21).

Polyether 7 (component c)

Polyethylene glycol having a molecular weight of 6,000.

Polyether 8 (component c)

Polyethylene glycol having a molecular weight of 9,000.

Polyether 9 (component b)

A polyether triol having a molecular weight of 3,000 and prepared by the propoxylation of trimethylol propane.

Polyether 10 (component b)

A polyether triol having a molecular weight of 6,000 and prepared by the propoxylation of trimethylol propane and subsequent ethoxylation of the propoxylation product (ratio by weight of PO:EO =87:13).

Polyether 11 (component b)

A polyether triol having a molecular weight of 4,800 and prepared by the propoxylation of trimethylol propane and subsequent ethoxylation of the propoxylation product (ratio by

EXAMPLES 1 to 25

(General procedure)

The polyisocyanates were added under nitrogen at 50° C. to the polyethers, which had been freed from water under vacuum, and reacted for 1 h at 80° C.. After cooling to 23° C., the viscosities and contents of isocyanate groups were determined.

100 g quantities of the NCO semiprepolymers obtained were dispersed in 400 ml of water at room temperature by stirring with a type T 45 N Ultraturrax (IRA, Staufen (Breisgau)/Fed.ReP. of Germany) at a speed of 10,000 r.p.m. After stirring for about 8 minutes, the mixtures were stirred at 250 r.p.m. for 5 h at a temperature of approximately 45° C. After cooling, the powders present were filtered under suction, dried and sieved.

Examples 1, 2, 3, 5, 6, 7 and 8 are Comparison Examples. In Examples 1 and 2, dimethylol propionic acid was used in the preparation of the NCO semiprepolymers and sodium hydroxide was added to the water in a quantity sufficient to neutralize the carboxyl groups. These examples demonstrate that ionically modified NCO semiprepolymers were not sufficient for the production of powders.

In Example 3, there was no hydrophilic modification. This product of this example was also not sufficient for the production of a powder.

Polyethers 2 to 5, which have a considerable content of ethylene oxide in the form of mixed blocks which do not correspond to the definition of component c), were used in Examples 5, 6, 7 and 8.

The experimental results are shown in the following Tables. The quantities used in the various formulations are in grams.

Table 1 sets forth comparisons of the ionically modified products and the nonhydrophilically modified product with a corresponding product according to the invention.

Table 2 sets forth Comparison Examples 5 to 8 and Examples 9-11 according to the invention.

Table 3 sets forth Examples 12 to 15 according to the invention.

Table 4 sets forth Examples 16 to 25 according to the invention.

TABLE I

|  | Examples | | | |
| --- | --- | --- | --- | --- |
|  | 1 | 2 | 3 | 4 |
| Polyether 1 | 374 | 374 | 374 | 374 |

TABLE I-continued

| | Examples | | | |
|---|---|---|---|---|
| | 1 | 2 | 3 | 4 |
| T 80* | 195 | 195 | 195 | 195 |
| Dimethylol propionic acid | 3 | 6 | — | — |
| Polyether 6 | — | — | — | 6 |
| % by weight ethylene oxide | — | — | — | 1 |
| % COO$^{(-)}$ | 0.5 | 1.0 | — | — |
| viscosity (23° C.) mPa.s | 1400 | 1800 | 800 | 800 |
| % NCO calculated | 14.1 | 13.7 | 14.3 | 13.7 |
| % NCO found | 14.0 | 13.3 | 14.1 | 13.3 |
| % NCO after 8 days/23° C. | 13.7 | 13.2 | 13.8 | 13.2 |
| Spontaneous powder formation | no | no | no | yes |

*Mixture of 80% 2,4- and 20% 2,6-diisocyanatotoluene

TABLE 2

| | Example | | | | | | |
|---|---|---|---|---|---|---|---|
| | 5 | 6 | 7 | 8 | 9 | 10 | 11 |
| Polyether 1 | 374 | 374 | 374 | 374 | 374 | 374 | 374 |
| Polyether 2 | 9.6 | — | — | — | — | — | — |
| Polyether 3 | — | 10.6 | — | — | — | — | — |
| Polyether 4 | — | — | 10.6 | — | — | — | — |
| Polyether 5 | — | — | — | 6.6 | — | — | — |
| Polyether 7 | — | — | — | — | 6 | — | 6 |
| Polyether 8 | — | — | — | — | — | 6 | — |
| T 80 (T 65)* | 195 | 195 | 195 | 195 | 195 | 195 | 195 |
| % by weight ethylene oxide | 1.0 | 1.0 | 1.0 | 1.0 | 1.0 | 1.0 | 1.0 |
| Viscosity mPa.s | 1000 | 950 | 1000 | 1000 | 300** | 300** | 300** |
| % NCO calculated | 14.2 | 14.0 | 14.0 | 14.3 | 14.3 | 14.3 | 14.3 |
| % NCO found | 14.0 | 13.7 | 13.9 | 14.0 | 14.2 | 14.3 | 14.1 |
| Spontaneous powder formation | no | no | no | no | yes | yes | yes |

*in Examples 5-10 T 80, in Example 11 T 65 (65% 2,4- and 35% 2,6-isomer)
**at 50° C.

TABLE 3

| | Example | | | |
|---|---|---|---|---|
| | 12 | 13 | 14 | 15 |
| Polyether 1 | 374 | 374 | 374 | 374 |
| T 80 | 195 | 195 | — | — |
| IDPI* | — | — | 249 | — |
| MDI** | — | — | — | 280 |
| Polyether 7 | 3 | — | 8 | — |
| Polyether 6 | — | 12 | — | 10 |
| % NCO calculated | 14.4 | 14.1 | 13.0 | 12.4 |
| % NCO found | 14.0 | 13.9 | 13.0 | 11.9 |
| Viscosity, mPa.s | 270/54° C. | 900 | 2500 | 700 |
| % Ethylene oxide | 0.5 | 2.0 | 1.2 | 1.5 |
| Spontaneous dispersion | yes | yes | yes | yes |

*isophorone diisocyanate
**diisocyanatodiphenyl methane, isomer ratio 4,4'/2,2' = 60:40

TABLE 4

| | Example | | | | | | | | | |
|---|---|---|---|---|---|---|---|---|---|---|
| | 16 | 17 | 18 | 19 | 20 | 21 | 22 | 23 | 24 | 25 |
| Polyether 9 | 307 | — | — | — | — | — | — | — | — | — |
| Polyether 10 | — | 320 | — | — | — | — | — | — | — | — |
| Polyether 11 | — | — | 319 | 307 | 282 | 322 | 312 | 292 | 257 | 272 |
| T 65 | 178 | — | — | — | — | — | — | — | — | — |
| T 100* | — | 165 | — | — | — | — | — | — | — | — |
| T 80 | — | — | 168 | 168 | 168 | 168 | 168 | 168 | 168 | 168 |
| Polyether 6 | 15.5 | 15.5 | 12.5 | 25 | 50 | — | — | — | 75 | — |
| Polyether 7 | — | — | — | — | — | 10 | 20 | 40 | — | 60 |
| % Ethylene oxide | 2.5 | 2.5 | 2.0 | 4.0 | 8.0 | 2.0 | 4.0 | 8.0 | 12.0 | 12.0 |
| % NCO calculated | 14.5 | 14.5 | 14.5 | 14.5 | 14.5 | 14.4 | 14.5 | 14.6 | 14.6 | 14.6 |
| % NCO found | 14.1 | 14.0 | 13.9 | 13.9 | 13.6 | 13.6 | 13.7 | 12.1 | 13.8 | 14.1 |
| Viscosity mPa.s | 700 | 1400 | 1000 | 1000 | 900 | 340** | 400** | 4300** | 780** | 220** |
| Average particle size μm | 35 | 27 | 20 | 15 | 23 | 30 | 30 | 25 | 18 | 20*** |

*2,4-diisocyanatotoluene
**as measured at 45°
***contained coarse particles

TABLE 5

| | Example | | | | | | | | | |
|---|---|---|---|---|---|---|---|---|---|---|
| | 16 | 17 | 18 | 19 | 20 | 21 | 22 | 23 | 24 | 25 |
| % Urea groups | 9.7 | 9.6 | 9.6 | 9.6 | 9.4 | 9.4 | 9.5 | 8.4 | 9.5 | 9.7 |
| % Urethane groups | 3.7 | 2.7 | 2.4 | 2.4 | 2.4 | 2.4 | 2.4 | 2.3 | 2.3 | 2.2 |
| % (CH$_2$—CH$_2$—O)$_x$-groups (ethylene oxide) | 2.5 | 2.5 | 2.0 | 4.0 | 8.0 | 2.0 | 4.0 | 8.0 | 12.0 | 12.0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a crosslinked polyurethane-polyurea powder which comprises dispersing an NCO semiprepolymer in an aqueous medium, forming a powder and isolating the powder from the aqueous medium, said NCO semiprepolymer having an NCO content of 10 to 20%, being liquid at room temperature and/or dissolved in an isocyanate-inert, water-soluble solvent and comprising the reaction product of (a) a polyisocyanate component comprising at least one organic polyisocyanate with a polyol component having an average hydroxyl functionality of 2.3 to 4.0 and comprising (b) a hydrophobic polyol component containing less than 25% by weight of ethylene oxide units, —CH- 2—CH$_2$—O—, and comprising at least one polyether polyol having a molecular weight of 400 to about 10,000 and up to 10% by weight, based on the total weight of component b), of one or more polyhydric alcohols having a molecular weight below 400 and (c) a hydrophilic polyether component comprising a monohydric or polyhydric alcohol containing at least 70% by weight, based on the weight of component c), of structural units corresponding to the formula $$-(CH_2-CH-O)_n-$$
$$\phantom{-(CH_2-}|$$
$$\phantom{-(CH_2-C}R$$

wherein n equals 15 to 80 and

R is hydrogen or a methyl group, provided that at least 80% of the substituents R are hydrogen, said hydrophilic polyether component being present in an amount sufficient to provide said NCO semi-prepolymer with a content of about 0.5 to 12% by weight of said structural units.

2. A crosslinked polyurethane-polyurea powder which is prepared by a process which comprises dispersing an NCO semiprepolymer in an aqueous medium, forming a powder and isolating the powder from the aqueous medium, said NCO semiprepolymer having an NCO content of 10 to 20%, being liquid at room temperature and/or dissolved in an isocyanate-inert, water-soluble solvent and comprising the reaction product of (a) a polyisocyanate component comprising at least one organic polyisocyanate with a polyol component having an average hydroxyl functionality of 2.3 to 4.0 and comprising (b) a hydrophobic polyol component containing less than 25% by weight of ethylene oxide units, —CH$_2$—CH$_2$—O—, and comprising at least one polyether polyol having a molecular weight of 400 to about 10,000 and up to 10% by weight, based on the total weight of component b), of one or more polyhydric alcohols having a molecular weight below 400 and (c) a hydrophilic polyether component comprising a monohydric or polyhydric alcohol containing at least 70% by weight, based on the weight of component c), of structural units corresponding to the formula $$-(CH_2-CH-O)_n-$$
$$\phantom{-(CH_2-}|$$
$$\phantom{-(CH_2-C}R$$

wherein n equals 15 to 80 and

R is hydrogen or a methyl group, provided that at least 80% of the substituents R are hydrogen, said hydrophilic polyether component being present in an amount sufficient to provide said NCO semi-prepolymer with a content of about 0.5 to 12% by weight of said structural units.

3. A two-component polyurethane coating composition comprising a polyisocyanate component, an isocyanate-reactive component and a filler wherein the filler comprises the crosslinked polyurethane-polyurea powder of claim 2.

* * * * *